United States Patent [19]

Rao

[11] 4,253,137
[45] Feb. 24, 1981

[54] SWITCHED-MODE POWER SUPPLY
[75] Inventor: Neti R. M. Rao, Eindhoven, Netherlands
[73] Assignee: U.S. Philips Corporation, New York, N.Y.
[21] Appl. No.: 882,271
[22] Filed: Feb. 28, 1978
[30] Foreign Application Priority Data
Mar. 11, 1977 [NL] Netherlands ......................... 7702638
[51] Int. Cl.³ .............................................. H02M 3/28
[52] U.S. Cl. ........................................ 363/21; 363/28
[58] Field of Search ................... 331/112; 363/18–21, 363/27, 28, 30, 97, 131
[56] References Cited
U.S. PATENT DOCUMENTS
3,740,639  6/1973  Easter .................................. 363/21
3,935,526  1/1976  Kamata et al. ...................... 363/21
4,087,850  5/1978  Koizumi .............................. 363/21

FOREIGN PATENT DOCUMENTS
683583    1/1967  Belgium ................................... 331/112
1588691   5/1970  Fed. Rep. of Germany ............. 363/18

Primary Examiner—William M. Shoop
Attorney, Agent, or Firm—Thomas A. Briody; William J. Streeter; Bernard Franzblau

[57] ABSTRACT

A switched-mode power supply with mains isolation comprising a primary circuit with a switch, a first secondary circuit working simultaneously with the switch and which generates a non-regulated voltage and a second, non-simultaneous, secondary circuit which forms part of a flyback converter. The sum of the two generated voltages is regulated.

25 Claims, 7 Drawing Figures

SWITCHED-MODE POWER SUPPLY

The invention relates to a switched-mode power supply for converting an input D.C. voltage into an output D.C. voltage which is substantially independent of variations in the input voltage and to which output voltage a load is connected. In this type of device the series arrangement of a primary winding of a transformer and a controlled switch is connected to the terminals of the input voltage source, the switch, in operation, being periodically brought into alternately the conducting and the cut-off state. The duration of the conducting state of the switch is adjustable depending upon the output voltage. The circuit further comprises a rectifier connected to a secondary winding of the transformer with its conduction direction chosen in relation to the winding sense of the secondary winding such that the rectifier conducts during the cut-off period of the switch.

In principle a switched-mode power supply comprises at least the following components: a switch, an inductor, a rectifier, capacitor and a load. The load may be considered as a resistance which is in parallel with the capacitor. During the part of the period in which the switch conducts a current originating from the input voltage source passes through the inductor so that energy which is derived from this source is stored in the inductor. During the other part of the period, in which the switch is not conducting, the energy stored in the inductor produces a current through the rectifier which current recharges the capacitor and, consequently, replenishes the energy losses caused by the load. By the adjustment or control of the conducting period of the switch relative to the cycle, the output D.C. voltage across the load can be independent of variations of the input D.C. voltage, for example, it can be kept constant. Such variations are caused by, for example, fluctuations in the electric AC supply where the input voltage is derived therefrom by rectification.

It can be easily seen that in principle only three variants of the circuit are possible so that other variants can always be reduced to one of these three variants. In the so-called forward (series-) converter the series arrangement of the switch and the inductor is connected between the voltage-carrying terminal of the input voltage source and the voltage-carrying terminal of the output voltage whereas the rectifier is connected between the junction of the switch and the inductor on the one hand and the other terminal of the input voltage source, the latter terminal being connected to the other terminal of the output voltage on the other hand. In the so-called flyback (parallel-) converter the rectifier and the inductor have changed places relative to the forward converter. Finally, in the so-called "up converter" the switch and the inductor have changed places relative to the flyback converter.

For some uses a D.C. isolation between the input voltage source and the output voltage is absolutely required. This is the case, for example, with power supplies of television receivers especially where it is desirable to connect additional apparatus to the receiver, such as, for example, video storage devices or television game circuits. A switched-mode power supply is eminently suitable for this purpose as the transformer which must effect that isolation passes signals which usually have a much higher frequency, for example 15 to 20 kHz, than those of the electric AC supply source so that said transformer may be relatively small in size.

With a switched-mode power supply of the flyback converter type the inductor of the converter can be implemented in a simple manner as a transformer. A primary winding thereof is connected in series with the switch between the terminals of the input voltage source whereas a secondary winding is in series with the rectifier. The publication "Philips Application Information" 472: "properties of d.c.-to d.c. converters for switched-mode power supplies" of Mar. 18, 1975 describes such a circuit. Of the three types the flyback converter has the best control properties which is evidenced by the formula which expresses the output voltage as a function of the input voltage and of the ratio of the time of conduction of the switch to the entire cycle. However, it should be noted that the entire energy which is supplied to the load by a flyback converter must be passed on by the transformer which imposes higher requirements both on the transformer and, particularly, on the storage capacity thereof as well as on the switch.

The same publication also described the forward converter with AC supply voltage isolation. From this it appears that two inductive elements are necessary, namely the AC supply isolating transformer and the inductor for storing supply energy. Only a part of the energy to be transferred is stored in the inductor as the remaining part travels directly from the input voltage source to the load during the time the switch conducts, which imposes less severe requirements on the two inductive components. The fact that two of these components are required may be considered a drawback.

The "up converter" has the drawback that the output voltage is always higher than the input voltage so that in most cases it cannot be used for television receivers in which the input voltage is derived from the electric AC supply. In addition, AC supply voltage isolation is not possible because one end of the inductor is connected to a terminal of the input voltage source. Therefore, if the inductor is constructed as a transformer for the purpose of AC supply isolation then this connection is interrupted. It is also true that in the "up converter" a portion of the energy to be transferred is directly supplied by the input voltage source.

It is an object of the invention to provide a switched-mode power supply which is provided with a D.C. isolation between the input voltage source and the load and which can be considered as a variant of the "up converter" type. Consequently, the requirements then imposed on the energy storage capacity of the isolating transformer are not high, while only one inductive component is required and the control properties are comparable to those of the flyback converter. It is also an object of the invention to provide a greater freedom as regards the output voltage so that it can also be lower than the input voltage. To this end, in accordance with the invention, a switched-mode power supply as mentioned in the preamble is characterized in that a second rectifier is connected to a secondary winding of the transformer with its conduction direction in relation to the winding sense of said secondary winding such that the second rectifier conducts during the conduction period of the switch, the output D.C. voltage being the sum of the first D.C. voltage generated by the first rectifier and the second D.C. voltage generated by the second rectifier.

The invention will be further explained by way of non-limitative example with reference to the accompanying drawings in which.

Figure 1:
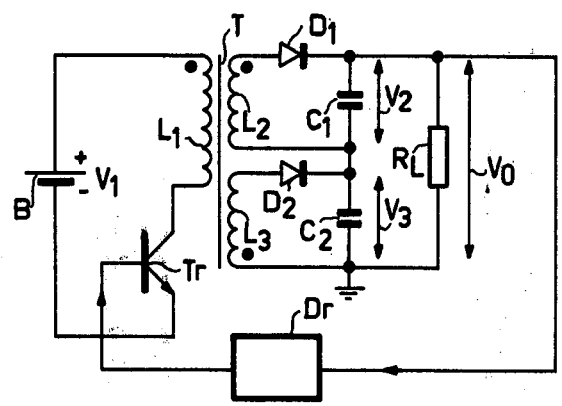
FIG. 1 shows a first embodiment of the circuit according to the invention.

In FIG. 1 Tr represents an npn-switching transistor whose collector is connected through a primary winding $L_1$ of a transformer T to the positive terminal of a power supply source B, the emitter being connected to the negative terminal of source B. An input D.C. voltage $V_1$ is present at the terminals of source B. Source B may be a battery or may represent a rectifier circuit by means of which the voltage of the electric AC supply voltage is rectified and smoothed in known manner.

FIG. 1 shows two secondary windings $L_2$ and $L_3$ of transformer T. One end of each winding is connected to the anode of a diode $D_1$ and $D_2$ respectively, the other end thereof being connected to a lead of a capacitor $C_1$ and $C_2$ respectively. The other lead of capacitor $C_1$ and $C_2$ respectively is connected to the cathode of diode $D_1$ and $D_2$ respectively. The junction of components $L_2$ and $C_1$ is connected to that of components $D_2$ and $C_2$ and a load $R_L$ is connected on the one hand to the junction of components $D_1$ and $C_1$ and on the other hand to that of components $L_3$ and $C_2$. The winding sense of windings $L_1$, $L_2$ and $L_3$ is indicated in FIG. 1 by means of polarity dots.

Across load $R_L$, which can be considered as a resistor, there is, in operation, a D.C. voltage $V_o$ which is the sum of the voltage $V_2$ across capacitor $C_1$ and the voltage $V_3$ across capacitor $C_2$. Voltage $V_o$ is supplied to a driver stage Dr wherein it is compared with a reference voltage. Stage Dr generates in known manner a control signal which is applied to the base of transistor Tr for alternately driving it into the conducting and the cut-off condition. To this end stage Dr comprises an oscillator which generates a signal of, for example, 18 kHz and a pulse duration modulator which controls the duty cycle of transistor Tr relative to the entire cycle of the signal generated by the oscillator in a known manner such that $V_o$ is independent of variations of voltage $V_1$. Such variations can, for example, be caused by fluctuations in the supply voltage. Voltage $V_o$ can, for example, be kept constant. Stage Dr comprises a transformer (not shown) by means of which the D.C. isolation effected by transformer T is maintained between the primary and the secondary side thereof. The junction of winding $L_3$, capacitor $C_2$ and load $R_L$ can be connected to ground. If the apparatus of which the circuit described constitutes a part is a television receiver and if source B is an AC supply voltage rectifying circuit, then only the primary side of transformer T is D.C. coupled to the supply source whereas the sections of the receiver which are supplied with supply energy by the circuit described, which sections are represented by load $R_L$, are isolated from mains. In a television receiver the switching signal can have, in known manner, the frequency of the line oscillator.

In operation there is a square-wave voltage having a peak value equal to voltage $V_1$ across winding $L_1$. FIG. 1 shows that the winding sense of windings $L_1$, $L_2$ and $L_3$ and the direction of conduction of diodes $D_1$ and $D_2$ are chosen so that diode $D_1$ can conduct and diode $D_2$ cannot conduct in the periods of time in which transistor Tr conducts. For, in these periods the voltage at the end of each winding, indicated by a polarity dot, is positive relative to the other end. Diode $D_1$ rectifies the positive part of the square-wave voltage present across winding $L_2$. If $n_1$ is the number of turns of winding $L_1$ and $n_2$ the number of turns of winding $L_2$ then the rectified voltage is $V_2=(n_2/n_1)\cdot V_1$. The variations thereof are proportional to those of voltage $V_1$.

If transistor Tr is cutoff by means of the driver signal applied to its base, then no current flows through windings $L_1$ and $L_2$. Transformer T is not ideal, that is to say it has an inductance wherein energy is stored during the time transistor Tr conducts. During the cutoff time thereof this energy produces a current through winding $L_3$ and diode $D_2$. So components B, $L_1$, Tr, $L_3$, $D_2$ and $C_2$ as well as $R_L$ constitute a switched-mode power supply of the flyback type. If $n_3$ is the number of turns of winding $L_3$ then there is between voltages $V_1$ and $V_3$ the known relation $V_3=(n_3/n_1)\cdot(\delta/1-\delta)\cdot V_1$, where $\delta$ is the ratio of the time of conduction of transistor Tr to the entire cycle. Herewith it is assumed that the secondary current is not interrupted during the cutoff time of transistor Tr. This, of course, is not a requirement of the circuit, but another relation would otherwise be applicable. Because it is a requirement that voltage $V_o=V_2+V_3$ does not depend on variations in voltage $V_1$ it appears from the preceding relation that $\delta$ can be controlled so that the variations in voltage $V_3$, which depend on those of voltage $V_1$, compensate those of voltage $V_2$.

If the same number of turns is chosen for windings $L_1$, $L_2$ and $L_3$, that is to say $n_1=n_2=n_3$ then it is obtained that:

$$V_o=V_2+V_3=V_1/1-\delta.$$

Figure 2A:
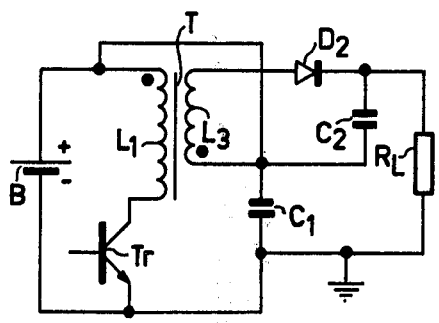
FIG. 2 shows how the circuit of FIG. 1 can be reduced in a special case to an "up converter", and FIGS. 3 to 7 inclusive show further embodiments of the circuit according to the invention.

This is the formula which applies to the "up converter" and from which it appears that $V_o$ exceeds $V_1$. That the circuit of FIG. 1 is actually a variant of an "up converter" can be proved as follows. If $n_1=n_2$ and if the AC isolation is dispensed with then the circuit of FIG. 1 changes into that of FIG. 2a in which components $L_2$ and $D_1$ are omitted and the ends of windings $L_1$ and $L_3$ which are indicated by dots are interconnected. With $n_1=n_2$, $V_2$ is equal to $V_1$ so that the rectifying circuit formed by components $L_2$ and $D_1$ is not necessary. FIG. 2a shows that the negative terminal of source B can be connected to the same ground as the lead of resistor $R_L$ which is not connected to capacitor $C_2$.

Figure 2B:
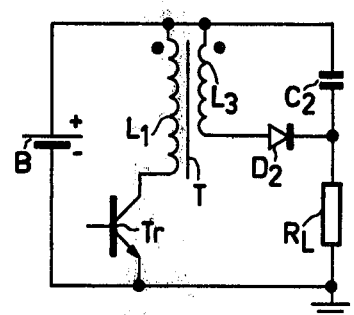

The circuit of FIG. 2a can be drawn as in FIG. 2b, in which capacitor $C_1$, which was in parallel with source B has been dispensed with. FIG. 2b shows that transformer T can be constructed as an auto-transformer, winding $L_3$ then being dispensed with whereas the anode of diode $D_2$ is connected to a tap of winding $L_1$. The circuit obtained in this manner is, indeed, a converter of the "up converter" type.

For foregoing has shown that the circuit of FIG. 1 can be reduced to an "up converter" provided $n_1=n_2$ and provided the AC supply voltage isolation is dispensed with. It will therefore be clear that the circuit, just like the "up converter", has the property that a portion of the energy supplied to the load is obtained directly from the input voltage source, namely that portion which causes voltage $V_2$. Only the other portion of the energy, namely the portion which causes voltage $V_3$, is first stored in transformer T. The said first portion is passed, as it were, outside the transformer.

Consequently the circuit can be designed in such a way that this portion is much greater than the other portion which only serves for compensating the fluctuations in the AC supply and which can be done better using the control properties of the flyback converter. The result thereof is that transformer T can be comparatively small in size, which means a considerable saving and which is advantageous for obtaining a tight coupling between the windings thereof, which causes less losses. From the above-mentioned relations between $V_2$ and $V_1$ on the one hand and $V_3$ and $V_1$ on the other hand it furthermore appears that by a proper choice of the transformer ratios $(n_2/n_1)$ and $(n_3/n_1)$ a value can be given to $V_o$ which is lower than the rated value of input voltage $V_1$.

Figure 3:
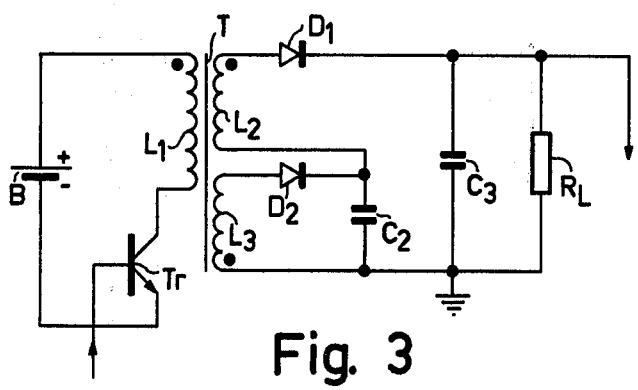

In FIG. 1 the bottom lead in of capacitor $C_1$ is not connected to ground. This may be considered a drawback. FIG. 3 shows a variant of the circuit of FIG. 1 which does not have this drawback. Herein capacitor $C_1$ is dispensed with whereas a capacitor $C_3$ is provided in parallel with the load $R_L$. If capacitor $C_3$ has a sufficiently high capacitance for the frequency of the switching signal then there is no A.C. voltage between the cathodes of diodes $D_1$ and $D_2$ so that capacitor $C_1$ is, indeed, superfluous.

In a similar manner a variant, not shown, of the circuit of FIG. 1 can be conceived wherein capacitor $C_1$ is maintained whereas a capacitor $C_2$ is dispensed with and wherein a capacitor $C_3$ is provided in parallel with load $R_L$. It is also possible that in FIG. 1 networks $L_2$, $D_1$, $C_1$ and $L_3$, $D_2$, $C_2$ change places.

Figure 4:
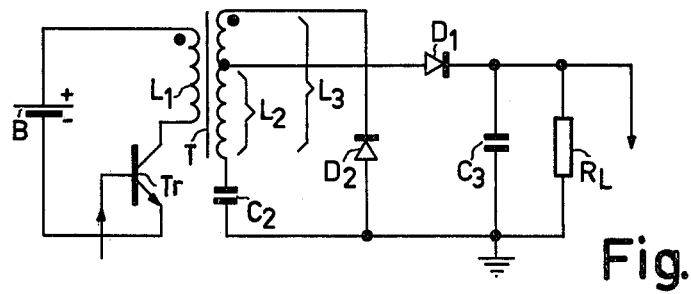

In the circuit of FIG. 3 diode $D_2$ can be included between winding $L_3$ and ground, its then being connected to the end, indicated by the dot, of the winding. The circuit of FIG. 3 then changes into that of FIG. 4 wherein winding $L_2$ forms part of winding $L_3$, that is to say the anode of diode $D_1$ is connected to a tap of winding $L_3$. With a different rating winding $L_3$ would form part of winding $L_2$ or coincide therewith. It will be clear that the circuit of FIG. 4 operates in the same way as that of FIG. 3 and, consequently, as that of FIG. 1: diode $D_1$ conducts during the conduction time of transistor Tr whereas diode $D_2$ conducts during the time transistor Tr is cut off. As in the case in FIG. 3 the output voltage present across capacitor $C_3$ is the sum of the voltage which has been obtained by means of the diode $D_1$, which operates as a peak rectifier, and of the voltage which is obtained by means of diode $D_2$, which operates as a flyback converter-rectifier.

Figure 5:
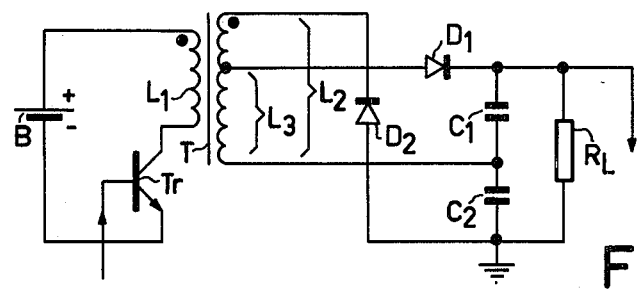

The variant of the circuit according to the invention shown in FIG. 5 is obtained by altering FIG. 1 in the same manner as described above for FIG. 3. During the conduction time of transistor Tr current flows through winding $L_2$ into the direction of the dot and through diode $D_1$, which causes capacitor $C_1$ to be recharged. During the time transistor Tr is cutoff current flows through winding $L_3$, as in FIG. 4, in the direction which is opposite to the current mentioned above, and through diode $D_2$, which current recharges capacitor $C_2$.

It will be noted that it is possible to interchange the parts played by diodes $D_1$ and $D_2$ in all described implementations of the circuit according to the invention, provided the polarity dots are moved accordingly. If in FIG. 1, for example, the dot at winding $L_2$ has been placed near the end shown at the lower end in the drawing whereas the dot at winding $L_3$ is placed near the upper end in the drawing then diode $D_2$ does and diode $D_1$ does not conduct simultaneously with transistor Tr so that voltage $V_2$ does and voltage $V_3$ does not depend on the ratio $\delta$.

Figure 6:
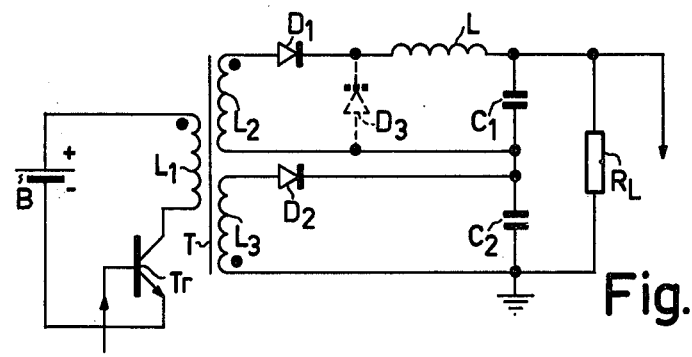

Owing to the "simultaneous" diode the peak value of the collector current of transistor Tr is rather high in the circuit according to the invention because the current transformed to the primary side and flowing through the diode is added to the primary current. In practice this value is somewhat reduced because the non-ideal transformer T has a leakage inductance which can be considered as an inductance in series with winding $L_1$. The peak value can be reduced still further by means of a low-value resistor or a low-value coil which is provided in FIG. 1 in series with diode $D_1$. FIG. 6 represents an example of such a coil L wherein a diode $D_3$, shown by means of a dotted line, is included between the junction point of components $D_1$ and L and that of components $L_2$ and $C_1$. Diode $D_3$ provides a path for the current flowing through coil L after transistor Tr and diode $D_1$ are cutoff. If coil L has a low inductance value, then the current through diode $D_3$ stops rather quickly, that is to say after some $\mu$s. Coil L also offers the advantage that the current occurring upon switch-on of the circuit, capacitors $C_1$ and $C_2$ having as yet no charge, is also reduced. Little energy is stored in coil L.

Figure 7:
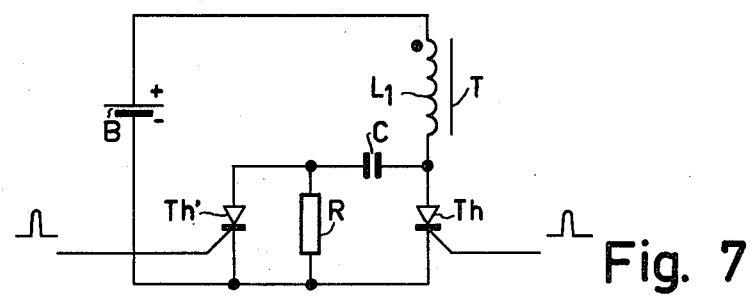

FIG. 7 shows the primary side of a circuit whose secondary side is identical to one of the circuits described above and wherein a thyristor Th is used as a switch instead of a transistor. Owing to the stringent current requirements such a component is particularly suitable here. A second thyristor Th' is used to extinguish thyristor Th. The anodes of the thyristors are interconnected via capacitor C and the cathodes are interconnected directly. A resistor R is in parallel with thyristor Th'.

Capacitor C is charged during the time thyristor Th conducts. At a given instant thyristor Th' is made conductive by means of a pulse at its cathode gate. A current which discharges capacitor C flows through thyristor Th'. This causes the current through thyristor Th to decrease. When this current has fallen below a given value of, for example, 5 mA, thyristor Th extinguishes. Thyristor Th' extinguishes when the discharge current of capacitor C has fallen below a given value whereafter the capacitor fully discharges into resistor R. The time between the turn-on instants of thyristors Th and Th' can be controlled in the same manner as the conduction time of transistor Tr in the implementations described above. Instead of thyristor Th' a transistor can be used whose collector-emitter path is in parallel with thyristor Th. This transistor, just like thyristor Th', must indeed be able to withstand a high current but this current only flows for a very short period of time during each cycle.

What is claimed is:

1. A switched-mode power supply circuit for converting an input D.C. voltage into an output D.C. voltage which is substantially independent of variations in the input voltage and to which output voltage a load is connected, the circuit comprising, a pair of input terminals for connection to a source of said input voltage, a transformer having a primary winding and secondary winding means, means connecting the series arrangement of said primary winding of the transformer and a controlled switch to the input terminals, means responsive to the output voltage for controlling the switch operation so that the switch is periodically brought alternately into the conducting and the cut-off states with the duration of the conducting state of the switch being adjustable as a function of the output voltage, a first rectifier connected to the secondary winding means of the tranformer with its polarity chosen in relation to the winding sense of the secondary winding means such that the rectifier conducts during the cut-off period of the switch, a second rectifier connected to the secondary winding means of the transformer with its polarity chosen in relation to the winding sense of said secondary winding means such that the second rectifier conducts during the conduction period of the switch, and means coupling the load to the first and second rectifiers so that the output D.C. voltage is the sum of first and second D.C. voltages derived from the first and second rectifiers, respectively.

2. A circuit as claimed in claim 1 further comprising a first capacitor coupled to the first rectifier for smoothing the first D.C. voltage and a second capacitor coupled to the second rectifier for smoothing the second D.C. voltage.

3. A circuit as claimed in claim 1 further comprising a first capacitor coupled to one of said first and second rectifiers for smoothing the D.C. voltage derived thereby, and a second capacitor connected directly in parallel with the load for smoothing the output D.C. voltage.

4. A circuit as claimed in claims 2 or 3, wherein the transformer secondary winding means includes first and second secondary windings with the first rectifier connected to the first secondary winding and the second rectifier to the second secondary winding.

5. A circuit as claimed in claim 4, wherein said first and second secondary windings have a common winding section.

6. A circuit as claimed in claims 2 or 3, further comprising means directly connecting one terminal of the first capacitor to one terminal of the second capacitor.

7. A circuit as claimed in claim 6 further comprising means connecting the load between the other terminals of the first capacitor and the second capacitor.

8. A circuit as claimed in claims 1 or 2 or 3 and further comprising an impedance element connected in series with the second rectifier.

9. A circuit as claimed in claim 8, wherein the impedance element comprises an inductor.

10. A circuit as claimed in claim 9 further comprising a third diode connected to a junction formed between the second rectifier and the inductor.

11. A circuit as claimed in claim 1 further comprising a first capacitor coupled to one of said first and second rectifiers for smoothing the D.C. voltage derived therefrom and a second capacitor coupled to the other one of said first and second rectifiers and to the load for smoothing the output D.C. voltage.

12. A power supply circuit as claimed in claim 1 further comprising a first capacitor coupled to the first rectifier to derive a first D.C. voltage across said first capacitor that is determined by the duration of the conducting state of the controlled switch and a second capacitor coupled to the second rectifier to derive a second D.C. voltage across said second capacitor that is substantially independent of the duration of the conducting state of the controlled switch.

13. A power supply circuit as claimed in claim 1 wherein the transformer secondary winding means includes first and second secondary windings and further comprising a first capacitor connected in series with said first rectifier between one terminal of the first secondary winding and a point of reference potential and a second capacitor connected in series with said second rectifier between one terminal of the second secondary winding and said point of reference potential, and said load coupling means couples the load in parallel with the second capacitor.

14. A power supply circuit as claimed in claim 1 wherein the transformer secondary winding means comprises first and second secondary windings coupled to the first and second rectifiers, respectively, and said load coupling means connects said first and second rectifiers and at least one of said secondary windings in series circuit across the load terminals.

15. A power supply circuit as claimed in claim 1 further comprising first and second capacitors, and wherein the transformer secondary winding means comprises a secondary winding having a tap point connected to a first terminal of the load via the second rectifier and first and second terminals connected to a second terminal of the load via the first rectifier and the first capacitor, respectively, and wherein the second capacitor is connected in parallel with the load.

16. A power supply circuit as claimed in claim 1 further comprising first and second capacitors, and wheren the transformer secondary winding means comprises a secondary winding having a tap point connected to a first terminal of the load via the second rectifier and first and second terminals connected to a second terminal of the load via the first rectifier and the first capacitor, respectively, and wherein the second capacitor is connected in series with the first capacitor across the first and second terminals of the load.

17. A switching voltage regulator circuit comprising, a pair of input terminals for connection to a source of input voltage, an output terminal for supplying a D.C. output voltage to a load, a transformer having a primary winding and secondary winding means, controlled switching means having a control electrode, means connecting the transformer primary winding in series circuit with said switching means across the input terminals, first and second rectifiers coupling the secondary winding means to the output terminal with said rectifiers polarized relative to the winding sense of the secondary winding means so that the first rectifier conducts during the cut-off period of the switching means and the second rectifier conducts during the conduction period of the switching means, the output terminal being coupled to the first and second rectifiers so that the output D.C. voltage is the sum of first and second D.C. voltages derived by the first and second rectifiers, respectively, and control means responsive to the output voltage and coupled to the switching means control electrode for alternately driving the switching means into conduction and cut-off with a duty cycle that varies as a function of the output voltage such that the first and second D.C. voltages derived by the first and second rectifiers compensate each other whereby the D.C. output voltage at the output terminal is substantially independent of variations in the input voltage.

18. A switching voltage regulator circuit as claimed in claim 17 further comprising first and second filter capacitors coupled to said first and second rectifiers, respectively, across which capacitors said first and second D.C. voltages are developed.

19. A switching voltage regulator circuit as claimed in claim 18 wherein said control means includes an oscillator and a pulse width modulator which controls the duty cycle of the switching means.

20. A switching voltage regulator circuit as claimed in claim 17 further comprising a first filter capacitor coupled to one of said rectifiers for smoothing the D.C. voltage derived by said one rectifier and a second filter capacitor coupled to the output terminal so as to smooth the output D.C. voltage.

21. A switching voltage regulator circuit as claimed in claim 20 wherein the transformer secondary winding means includes first and second secondary windings coupled to the first and second rectifiers, respectively.

22. A switching voltage regulator circuit as claimed in claims 17 or 18 wherein the transformer includes a magnetic core and further comprising an inductor connected in series with the second rectifier so as to limit the current flow in said switching means, said inductor having a low inductance value that is independent of the level of magnetic flux in the core of the transformer during the conduction period of the switching means.

23. A switching voltage regulator circuit as claimed in claim 18 wherein the transformer secondary winding means comprises first and second secondary windings coupled to the first and second rectifiers, respectively, the first and second transformer secondary windings having a different number of turns chosen so that said first and second D.C. voltages developed across the first and second capacitors are unequal.

24. A voltage regulator circuit as claimed in claim 17 further comprising a first capacitor coupled to the first rectifier to derive a first D.C. voltage across said first capacitor that is determined by the duty cycle of the switching means, and a second capacitor coupled to the second rectifier to derive a second D.C. voltage across said second capacitor that is substantially independent of the duty cycle of the switching means.

25. A switching voltage regulator circuit as claimed in claim 17 wherein the transformer secondary winding means comprises first and second secondary windings coupled to the first and second rectifiers, respectively, and with the second winding having a greater number of turns than the first winding.

* * * * *